United States Patent
Kubota et al.

(10) Patent No.: US 9,390,531 B2
(45) Date of Patent: Jul. 12, 2016

(54) MOVABLE BODY DISPLAY DEVICE AND MOVABLE BODY DISPLAY METHOD

(71) Applicant: FURUNO Electric Company Limited, Nishinomiya, Hyogo (JP)

(72) Inventors: Yugo Kubota, Nishinomiya (JP); Yasuhisa Fujii, Nishinomiya (JP)

(73) Assignee: FURUNO ELECTRIC COMPANY LIMITED, Hyogo (JP)

(*) Notice: Subject to any disclaimer, the term of this patent is extended or adjusted under 35 U.S.C. 154(b) by 98 days.

(21) Appl. No.: 14/203,737

(22) Filed: Mar. 11, 2014

(65) Prior Publication Data

US 2014/0306997 A1 Oct. 16, 2014

(30) Foreign Application Priority Data

Mar. 11, 2013 (JP) .................. 2013-047992

(51) Int. Cl.
*G06T 11/60* (2006.01)
*G01S 13/86* (2006.01)
*G01S 13/93* (2006.01)

(52) U.S. Cl.
CPC .............. *G06T 11/60* (2013.01); *G01S 13/86* (2013.01); *G01S 13/9307* (2013.01)

(58) Field of Classification Search
None
See application file for complete search history.

(56) References Cited

U.S. PATENT DOCUMENTS

| 5,307,074 A | * | 4/1994 | Janex | .................. 342/41 |
| 6,043,775 A | * | 3/2000 | Erickson | ............. G01S 7/298 |
| | | | | 342/176 |
| 8,423,278 B2 | * | 4/2013 | Kondo et al. | ............ 701/301 |
| 2012/0274504 A1 | * | 11/2012 | Kubota | .................. 342/179 |
| 2014/0337369 A1 | * | 11/2014 | Saukkonen | ............. 707/758 |

FOREIGN PATENT DOCUMENTS

| JP | 2005353032 A | * 12/2005 | ............ G08G 3/02 |
| JP | 4925525 B | 2/2012 | |
| JP | 4965035 B | 4/2012 | |

* cited by examiner

*Primary Examiner* — Barry Drennan
*Assistant Examiner* — Jason Pringle-Parker
(74) *Attorney, Agent, or Firm* — Global IP Counselors, LLP (57) ABSTRACT

A movable body display device includes an acquisition component, a memory component, an input component, a length adjuster, and a display controller. The acquisition component acquires position and speed of a movable body. The memory component stores a plurality of display ranges, a number of range rings for each display range, and a reference speed. The input component receives input designating one of the display ranges. The length adjuster adjusts length of a speed vector on a screen such that length of a speed vector indicating the reference speed on the screen is the same as a spacing of the range rings on the screen based on the display range. The display controller displays the movable body on the screen according to the position, and displays adjacent to the movable body a speed vector for which heading and length have been set based on the length and the speed.

9 Claims, 7 Drawing Sheets

| Display range | Number of range rings | Spacing of range rings | Reference speed |
|---|---|---|---|
| 4NM | 3 | 1NM | 10kn |
| 6NM | 2 | 2NM | 10kn |
| 10NM | 4 | 2NM | 10kn |
| 18NM | 2 | 6NM | 10kn |

*FIG. 3A*

| Display range | Number of range rings | Spacing of range rings | Reference speed |
|---|---|---|---|
| 4NM | 3 | 1NM | 10kn |
| 6NM | 2 | 2NM | 12kn |
| 10NM | 4 | 2NM | 8kn |
| 18NM | 2 | 6NM | 12kn |

MOVABLE BODY DISPLAY DEVICE AND MOVABLE BODY DISPLAY METHOD

CROSS-REFERENCE TO RELATED APPLICATIONS

This application claims priority to Japanese Patent Application No. 2013-047992 filed on Mar. 11, 2013. The entire disclosure of Japanese Patent Application No. 2013-047992 is hereby incorporated herein by reference.

BACKGROUND

1. Field of the Invention

The present invention relates mainly to a movable body display device that gives a graphic display of the position and speed of watercraft and other movable bodies.

2. Background Information

In the past, in the field of watercraft, AIS (universal shipborne automatic identification system) and TT (target tracking) are known methods for acquiring the position and speed of other vessels. With AIS, vessels wirelessly send position information, navigation information, and so forth to their surroundings, and receive information sent by other vessels, thereby acquiring the position, speed, and so forth of the other vessels. TT involves sensing the position, speed, and so forth of a target located near the host vessel based on the change in past radar images.

Figure 7A:
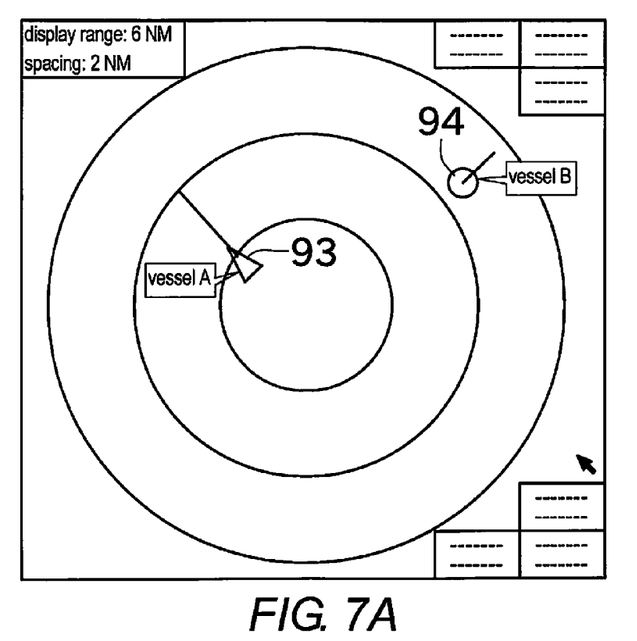
FIGS. 7A and 7B show the screen displayed on a conventional movable body display device.
Figure 7B:
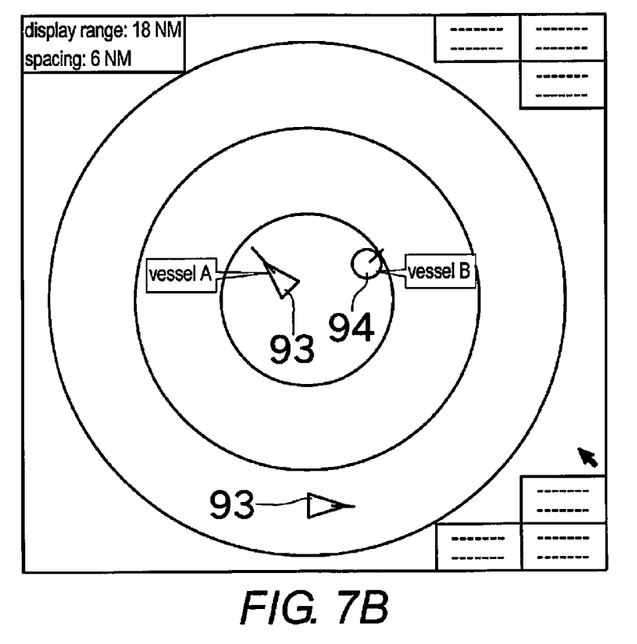

Japanese Patent Nos. 4,965,035 (Patent Literature 1) and 4,925,525 (Patent Literature 2) disclose a display device for displaying the position, speed, and so forth of other vessels by using AIS and TT (ARPA). As shown in FIGS. 7A and 7B, with this type of display device, vessels are displayed using an AIS symbol 93 or a TT symbol 94. The triangular or round figure of the AIS symbol 93 or TT symbol 94 represents the position of a vessel. The line segment of the AIS symbol 93 or TT symbol 94 is the speed vector, which indicates the speed of the vessel.

SUMMARY

With this type of display device, however, a plurality of display ranges are preset, and these display ranges are switched according to user input, etc. For example, in FIG. 7A, the display range is 6 NM (nautical miles), so a range with a radius of 6 NM from the host vessel is displayed.

If the display range is trebled (from 6 NM to 18 NM), the scale will be ⅓, so the length of the speed vector is usually also adjust to ⅓ (see FIG. 7B). That is, as the display range is increased, the speed vector displayed on the screen becomes shorter. Therefore, if the vessel is low in speed, or if the display range is greatly enlarged, the length of the speed vector will be too short, which can make it harder to tell the speed of the vessel. In this case, there is no problem if the user wants to know the predicted position of the craft from the speed vector, but if the user wants to know the speed of the craft from the speed vector, then the display setting (vector time) must be changed.

On the other hand, if the display range is made smaller, the speed vector will become correspondingly longer. In this case, there is the possibility that the speed vector of a high-speed vessel cannot be completely displayed within the screen. Therefore, here again the display setting of the speed vector must be changed.

Thus, with a display device that allows the display range to be varied, there is room for improvement in the method for displaying the speed vector of a vessel. Furthermore, this problem is not limited to watercraft, and also pertains in general to movable body display devices that display the position and speed of a movable body.

The present invention was conceived in light of the above situation, and it is a main object thereof to provide a movable body display device configured such that it is easy to ascertain the speed of a movable body even when the display range is changed.

The problem to be solved by the present invention is as given above, and the means for solving this problem, and the effects thereof, will now be described.

A first aspect of the present invention provides a movable body display device with the following configuration. Specifically, this movable body display device comprises an acquisition component, a memory component, an input component, a length adjuster, and a display controller. The acquisition component is configured to acquire position and speed of a movable body. The memory component is configured to store a plurality of display ranges, a number of range rings for each display range, and a reference speed. The input component is configured to receive input designating one of the display ranges. The length adjuster is configured to adjust length of a speed vector on a screen such that length of a speed vector indicating the reference speed on the screen is the same as a spacing of the range rings on the screen based on the display range received by the input component. The display controller is configured to display the movable body on the screen according to the position acquired by the acquisition component, and is configured to display adjacent to the movable body a speed vector for which heading and length have been set based on the length adjusted by the length adjuster and the speed acquired by the acquisition component.

Consequently, the user can ascertain the speed of a movable body merely by comparing the length of its speed vector with the spacing of the range rings. Also, since the range rings are used as graduations, the screen can be more effectively utilized than with a configuration in which a reference length is displayed at the lower edge of the screen, for example.

This movable body display device preferably has the following configuration. Specifically, the input component is further configured to receive designation of the number of range rings displayed on the screen at a current display range. When the input component has received the designation of the number of range rings, the length adjuster is configured to adjust the length of the speed vector indicating the reference speed based on the number of range rings, and the display controller is configured to display the speed vector based on the length of the adjusted speed vector.

Consequently, the length of the reference for the speed vector is automatically adjusted merely by changing the number of range rings, which means less work for the user.

In the above movable body display device, it is preferable if the reference speed is configured to be displayed on the screen.

This allows the user to easily ascertain a specific value for the reference speed.

This movable body display device preferably has the following configuration. Specifically, the display controller has a position display mode for displaying the position of the movable body after a reference time period, in addition to a speed display mode for displaying the speed vector of the movable body. A position where the reference speed is displayed in the speed display mode is the same as a position where the reference time period is displayed in the position display mode.

Consequently, the same region can be utilized to display a reference value in the two display modes, so the screen can be utilized more effectively.

In the above movable body display device, it is preferable if the memory component is configured to store a different reference speed for each display range or for each number of range rings.

Consequently, since the spacing is narrower when there are more range rings, for example, the speed vector can be properly displayed by lowering the reference speed.

This movable body display device preferably has the following configuration. Specifically, the movable body includes a watercraft. The acquisition component is configured to acquire position and speed of other vessels based on at least one of an echo signal detected by a radar device and a signal used by a shipborne automatic identification system.

Consequently, since a plurality of vessels on the sea will be moving at various speeds and in various directions, the effect of the present invention can be favorably realized. Also, information about other vessels can be easily acquired by utilizing a radar device, an AIS device, or the like.

A second aspect of the present invention provides a movable body display method with the following configuration. Specifically, this method comprises an acquisition step, an input reception step, a length adjustment step, and a display step. In the acquisition step, position and speed of a movable body are acquired. In the input reception step, input designating one of a plurality of display ranges is received. In the length adjustment step, length of a speed vector on a screen is adjusted such that length of a speed vector indicating a reference speed on the screen is the same as a spacing of range rings on the screen based on the display range received in the input reception step. In the display step, the movable body is displayed on the screen according to the position acquired in the acquisition step, and a speed vector for which heading and length have been set based on the length adjusted in the length adjustment step and the speed acquired in the acquisition step is displayed adjacent to the movable body.

Consequently, the user can ascertain the speed of a movable body merely by comparing the length of the speed vector with the spacing of the range rings. Also, since the range rings are used as graduations, the screen can be more effectively utilized than with a configuration in which a reference length is displayed at the lower edge of the screen, for example.

Other objects, features, aspects and advantages of the present disclosure will become apparent to those skilled in the art from the following detailed description, which, taken in conjunction with the annexed drawings, discloses a preferred embodiment of the movable body display device and the movable body display method.

BRIEF DESCRIPTION OF THE DRAWINGS

Referring now to the attached drawings which form a part of this original disclosure.

DETAILED DESCRIPTION OF EMBODIMENTS

Figure 1:
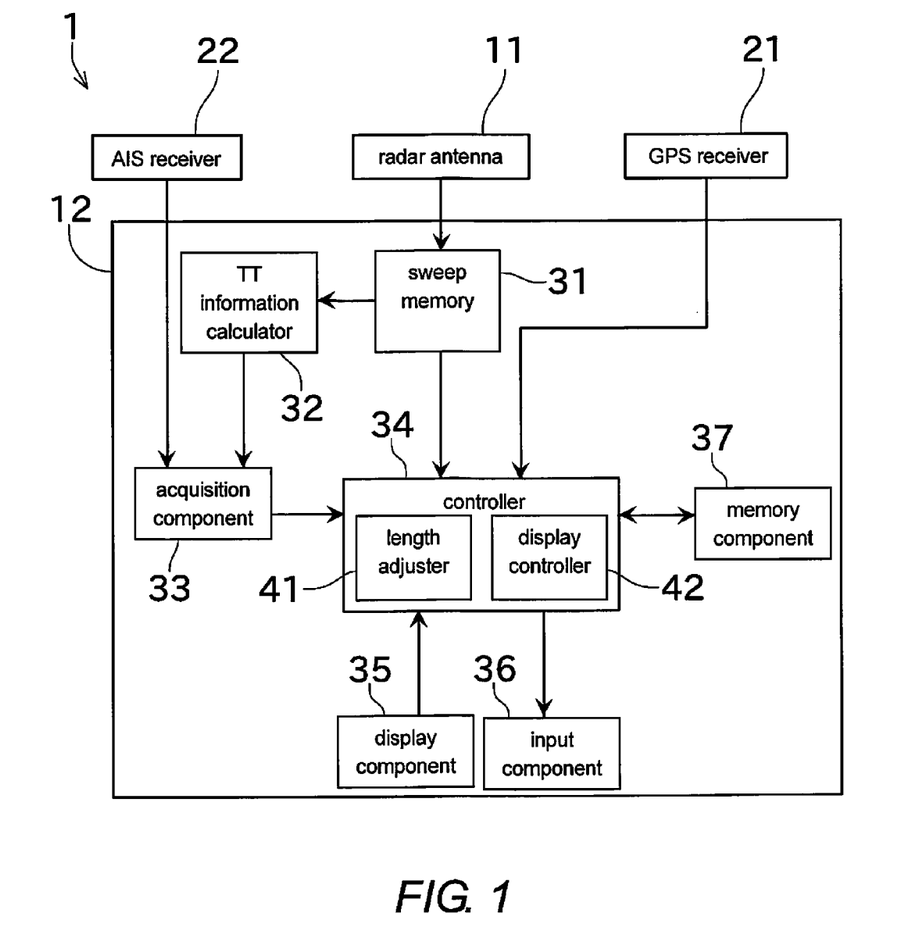
FIG. 1 is a block diagram of a radar device pertaining to an embodiment of the present invention.

A selected embodiment will now be explained with reference to the drawings. It will be apparent to those skilled in the art from this disclosure that the following descriptions of the embodiment are provided for illustration only and not for the purpose of limiting the invention as defined by the appended claims and their equivalents. FIG. 1 is a block diagram of a marine radar device 1 pertaining to an embodiment of the present invention.

As shown in FIG. 1, the marine radar device 1 in this embodiment comprises a radar antenna 11 and a radar indicator (movable body display device) 12.

The marine radar device 1 is configured as a pulse radar device, and the radar antenna 11 is configured so transmit strongly directional pulsed radio waves, and receive reflected waves (echoes) produced when these pulsed radio waves come back after being reflected by a target. Also, the radar antenna 11 is configured to rotate within the horizontal plane while repeatedly sending and receiving radio waves. With the above configuration, it is possible to scan an area of 360° around the host vessel.

A CW (continuous wave) radar or a pulse Doppler radar can be used instead of this pulse radar. Also, a radar device configured so that the radar antenna does not rotate can be used. For instance, there is no need to rotate the radar antenna with a radar device having antenna elements in all peripheral directions, or a radar device that senses only in a specified direction, such as forward.

A signal received by the radar antenna 11 is converted into digital data by A/D conversion or the like by the receiver circuit (not shown), and outputted to the radar indicator 12.

The radar indicator 12 comprises a sweep memory 31, a TT information calculator 32, an acquisition component 33, a controller 34, a display component 35, an input component 36, and a memory component 37. The radar indicator 12 is connected to the radar antenna 11 as well as to a GPS receiver 21 and an AIS receiver 22.

The data outputted from the radar antenna 11 is inputted to the sweep memory 31. The sweep memory 31 can store data for one rotation of the radar antenna 11. Because the data for one rotation of the radar antenna 11 is obtained by scanning within the horizontal plane over 360° centering on the host vessel, data indicating the shape and layout of objects around the host vessel is stored in the sweep memory 31.

The TT information calculator 32 is for providing a TT (target tracking) function. This TT (or ARPA) function is well known and therefore will not be described in detail here, but it estimates a speed vector by automatically sensing and acquiring the position of the object based on the data stored in the sweep memory 31, and tracking the movement of the object based on a time transition.

The marine radar device 1 is also connected to the MS receiver 22. The MS receiver 22 receives an AIS signal outputted from an AIS device installed on another vessel. The AIS signal contains information about the position, speed, course, and so forth of the other ship. The information about the other ship contained in the AIS signal (AIS information) is absolute terrestrial reference information.

The acquisition component 33 acquires the AIS information and TT information obtained above, and outputs it to the controller 34.

The GPS receiver 21 finds the position of the host vessel by acquiring a positioning signal transmitted by a GPS satellite, and performing positioning computation based on this positioning signal. The GPS receiver 21 outputs the resulting position of the host vessel to the controller 34.

The controller 34 comprises as its main components a ROM that stores programs for executing the various functions of the marine radar device 1, and a CPU that executes these programs. More specifically, the controller 34 produces a radar image indicating objects around the host vessel based on the data acquired from the sweep memory 31.

The controller 34 also comprises a length adjuster 41 and a display controller 42. The processing performed by the length adjuster 41 will be discussed at a later point. The display controller 42 can display information indicating the position of other vessels and so forth acquired from the acquisition component 33, superposed on the radar image on the display component 35. The TT information that is inputted here is information relative to the host vessel, and the AIS information that is inputted is absolute information, but the TT information and MS information are converted as needed according to the absolute position of the host vessel obtained from the GPS receiver 21.

The display component 35 is constituted by a liquid crystal, organic electroluminescence, or other such display, and can display the image produced by the controller 34. The image displayed by the display component 35 will be discussed in detail at a later point.

The input component 36 is constituted by keys, a mouse, a track ball, a touch panel, or the like, and receives input from the user. The input component 36 converts the received input into an electrical signal and outputs it to the controller 34.

The memory component 37 is constituted by a flash memory or the like, and stores various kinds of information related to the image displayed on the display component 35.

Figure 2:
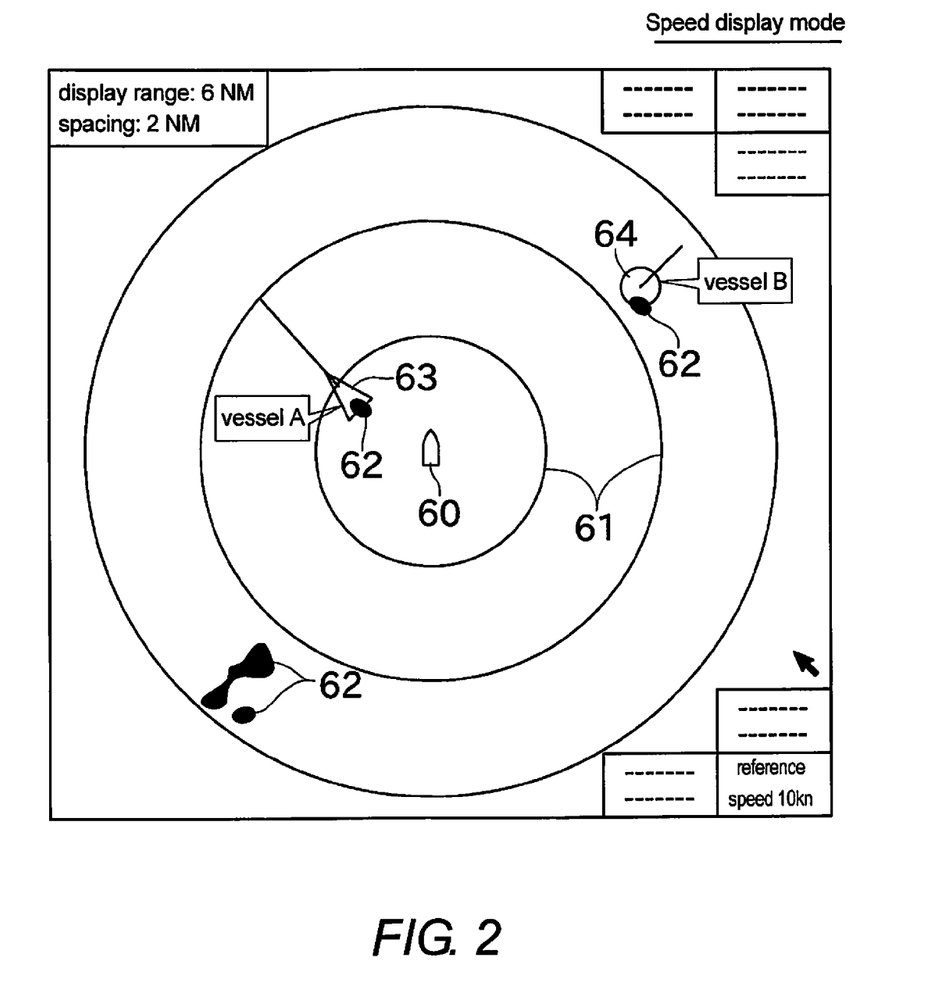
FIG. 2 shows an example of the screen in speed display mode.

Next, we will describe the image produced by the controller 34 and displayed on the display component 35. FIG. 2 shows an example of a screen displayed on the display component 35. On the screen in FIG. 2 are displayed a host vessel mark 60, range rings 61, echoes 62, an AIS symbol 63, and a TT symbol 64.

The host vessel mark 60 is a mark indicating the position of the host vessel. The display position of the host vessel mark 60 is arbitrary, and can, for example, be displayed in the center of the screen as shown in FIG. 2, or can be displayed in some other place.

The range rings 61 are centered on a reference position (the host vessel position), and are ring-shaped displays indicating specific distances from the reference position. The range rings 61 are spaced equidistantly. Unlike VRM (variable range markers), whose diameter can be varied as desired, the range rings 61 do not change in diameter unless the number of them displayed is changed. In FIG. 2, the display range is 6 NM, as shown at the upper-left of the screen, so the distance from the host vessel mark 60 to the outermost circle is 6 NM. Since there are two range rings 61 displayed equidistantly between the host vessel mark 60 and the outermost circle, the spacing of the range rings 61 is 2 NM.

Figure 3A:
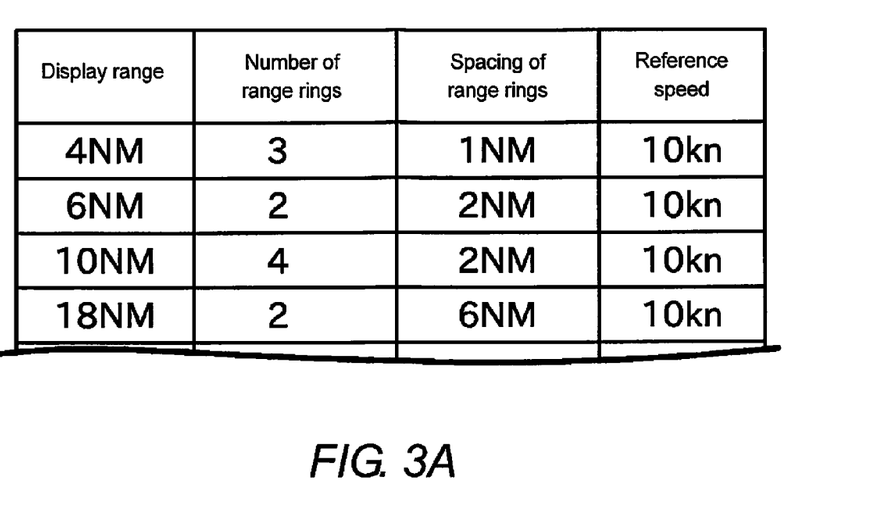
FIGS. 3A and 3B show examples of the information stored in the memory component.

As shown in FIG. 3A, a plurality of display ranges are stored in the memory component 37, and the number of range rings 61 is also set for each display range. The spacing (NM) of the range rings 61 can be stored in the memory component 37, or it can be calculated whenever needed from the display range and the number of range rings.

The echoes 62 are produced based on data stored in the sweep memory 31. The echoes 62 indicate other vessels, land, buoys, and so on.

The AIS symbol 63 is a mark produced based on an MS signal received by the above-mentioned AIS receiver 22. The AIS symbol 63 is made up of a triangular mark indicating the position of the vessel, and a line segment (speed vector) indicating the speed of the vessel.

The TT symbol 64 is a mark produced based on the TT information calculated by the above-mentioned TT information calculator. The TT symbol 64 is made up of a circular mark indicating the position of the vessel (object), and a line segment (speed vector) indicating the speed of the vessel (object).

In this embodiment, the line segments of the MS symbol 63 and the TT symbol 64 are determined so that the length of the speed vector of a reference speed (10 kn in this example, as shown at the lower-right of the screen in FIG. 2) will coincide with the spacing of the range rings 61 on the screen. Therefore, it can be seen that the vessel A shown in FIG. 2 has a speed of about 10 kn since the length of the speed vector substantially coincides with the spacing of the range rings 61. It can also be seen that the vessel B has a speed of about 5 kn since the length of the speed vector is about one-half the spacing of the range rings 61.

Figure 4:
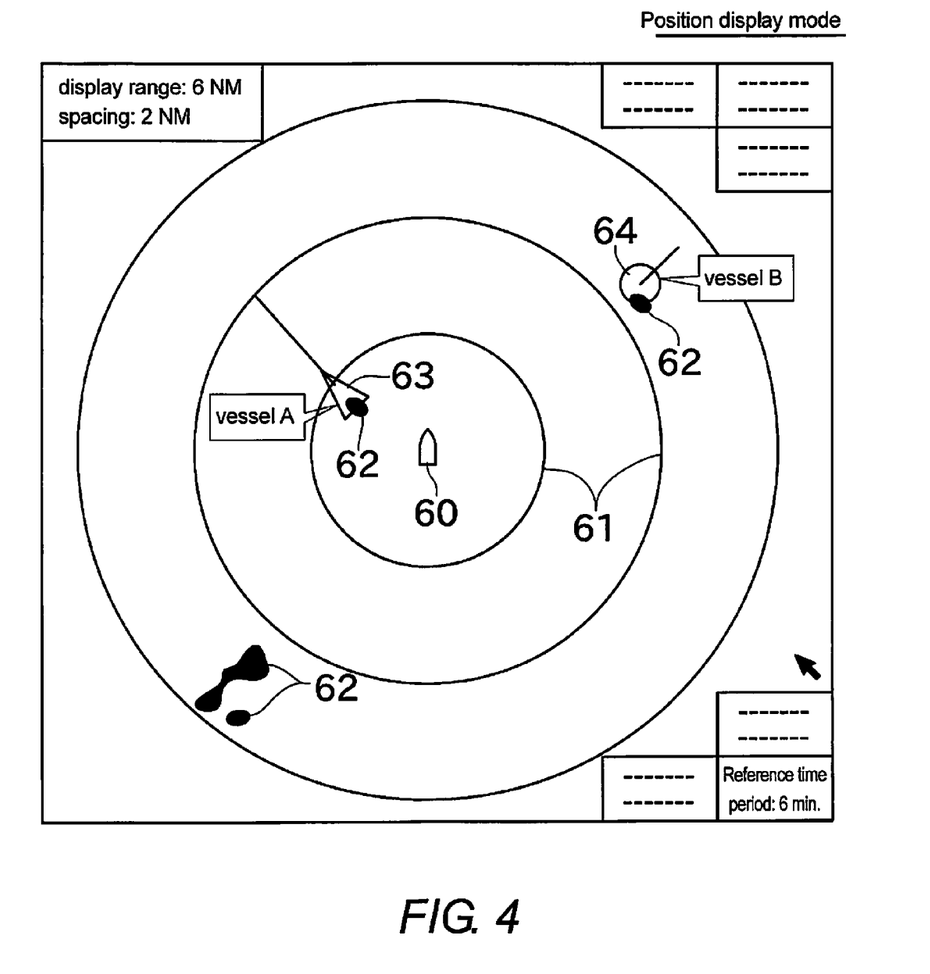
FIG. 4 shows an example of the screen in position display mode.

Also, in this embodiment, as shown in FIG. 4, in addition to a speed display mode in which the vessel speed is displayed as discussed above, there is also a position display mode in which the future position of the vessel is displayed. In position display mode, the distal ends of the line segments of the AIS symbol 63 and the TT symbol 64 indicate the positions of the vessels after a reference time period (6 minutes in this example, as shown at the lower-right of the screen in FIG. 4). The position of the vessel after the reference time period is calculated based on the current position and speed of the vessel.

Since the place where the reference speed is displayed in speed display mode is the same as the place where the reference time period is displayed in position display mode, the display area of the screen can be utilized more effectively. Also, the user can quickly ascertain whether the system is currently in speed display mode or position display mode by glancing at the lower-right part of the screen.

Next, we will describe the method for adjusting the length of the speed vector so that the length of the speed vector of the reference speed will coincide with the spacing of the range rings 61 as mentioned above, in speed display mode. This processing is carried out by the length adjuster 41 of the controller 34. Any method can be employed for adjusting the length of the speed vector, but two specific examples of this method will be described below.

The first method involves the concept of a reference time period in position display mode. That is, a specific reference time period is set, and the line segments of the AIS symbol 63 and the TT symbol 64 are drawn, so that the length of the speed vector will have the above-mentioned relation. This specific reference time period is found from the equation given below.

reference time period (min)=60×range ring spacing (NM)/reference speed (kn)

In the example shown in FIG. 2, for instance, the reference time period is 60×2/10=12 (min). Therefore, just as when the reference time period is set to 12 minutes, the length of the speed vector of the reference speed can be made to coincide with the spacing of the range rings 61 by determining the length of the line segment of the AIS symbol 63 or the TT symbol 64.

The second method involves utilizing the spacing of the range rings 61 on the screen. More specifically, the length adjuster 41 calculates the spacing of the range rings on the screen (in pixel units, for example) based on the number of range rings 61, the resolution of the screen, and so forth. The computation given in the next paragraph is then performed for each vessel to calculate the length of the speed vector.

length of the speed vector of vessel $X$ (pixels)=spacing of range rings (pixels)×speed of vessel $X$ (kn)/ reference speed (kn)

The length of the speed vector is then drawn in the calculated length to make the length of the speed vector of the reference speed coincide with the spacing of the range rings 61.

Next, a case in which the display range is changed will be described. In this embodiment, as shown in FIG. 3A, a plurality of display ranges are stored. The user operates the input component 36 as desired to designate a new display range, whereupon an image is drawn at the new display range.

The length adjuster 41 of the controller 34 performs the above-mentioned computation at this point, and recalculates the length of the speed vector of the AIS symbol 63 and the TT symbol 64 on the screen. The display controller 42 then redraws the AIS symbol 63 and the TT symbol 64 at the newly found lengths.

Figure 5:
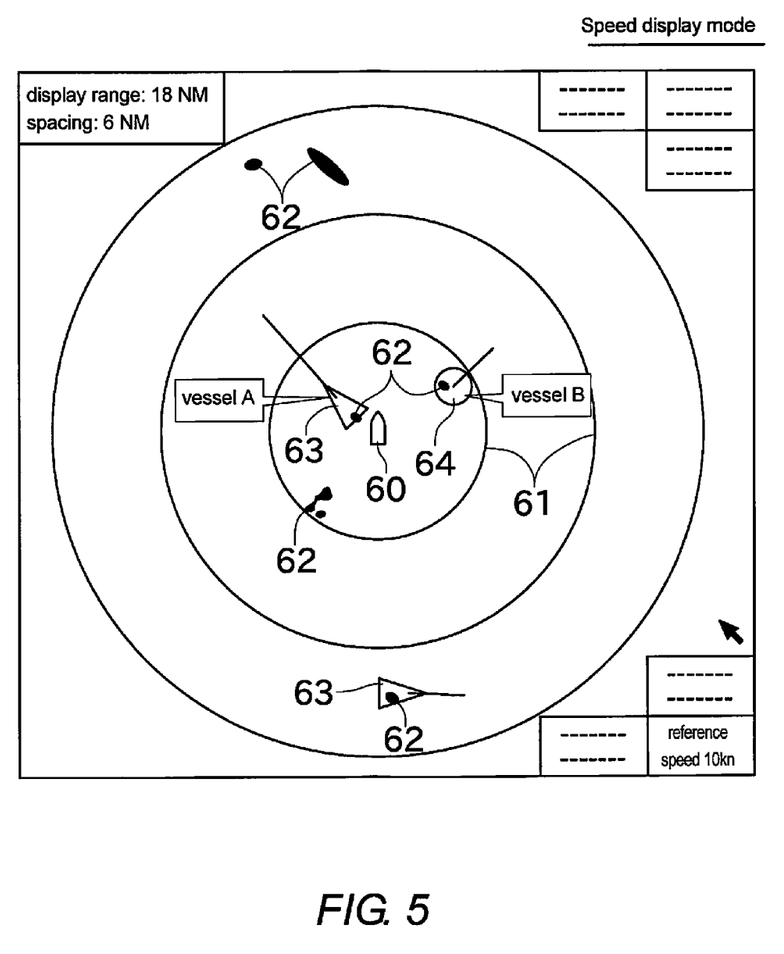
FIG. 5 shows the screen when the display range has been changed.

FIG. 5 shows the screen when the display range has been enlarged three times (from 6 NM to 18 NM) from the state in FIG. 2. As shown in FIG. 3A, when the display range is 18 NM, there are two range rings 61, so there is no change in the number of range rings 61. Therefore, in this case the echoes 62 are smaller in size, but there is no change in the length on the screen of the speed vector of the AIS symbol 63 and the TT symbol 64.

Therefore, compared to the conventional display method shown in FIGS. 7A and 7B, it can be seen that the display method of this embodiment clearly makes it easier to ascertain the speed of the vessel. Furthermore, even if the number of range rings 61 should change from two to four, the length of the speed vector will only be less than one-half, so it will still be easy to see the speed of the vessel.

Next, we will describe a case in which the display range is not changed, but the number of range rings 61 is changed. In this embodiment, the user can change the number of range rings 61 while leaving the display range alone, by suitably operating the input component 36.

The length adjuster 41 of the controller 34 at this point performs the above-mentioned computation to recalculate the length of the speed vector of the AIS symbol 63 and the TT symbol 64 on the screen. The display controller 42 then redraws the AIS symbol 63 and the TT symbol 64 at the newly found lengths.

Figure 6:
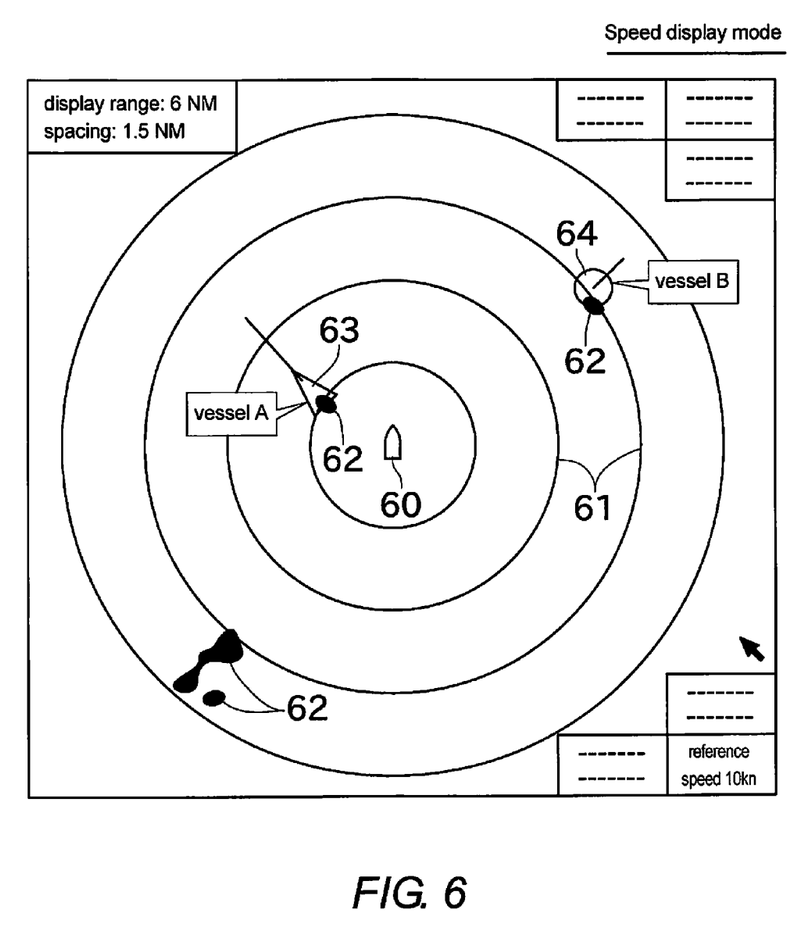
FIG. 6 shows the screen when the number of range rings has been changed.

FIG. 6 shows a screen in which the display range remains the same, but the number of range rings 61 has been changed from two to three, from the state in FIG. 2. In this case, the spacing of the range rings 61 is ¾, so the length of the speed vector is also ¾.

As described above, the radar indicator 12 in this embodiment comprises the acquisition component 33, the memory component 37, the input component 36, the length adjuster 41, and the display controller 42. The acquisition component 33 acquires the position and speed of a vessel. The memory component 37 stores a plurality of display ranges, the number of range rings 61 for each display range, and a reference speed. The input component 36 receives input designating a display range. The length adjuster 41 adjusts the length on the screen of the speed vector so that the spacing of the range rings 61 on the screen will be the same as the length of the speed vector indicating the reference speed on the screen, based on the display range received by the input component 36. The display controller 42 displays vessels on the screen according to the positions acquired by the acquisition component 33, and displays near each movable body a speed vector obtained by setting the heading and length based on the length adjusted by the length adjuster 41 and the speed acquired by the acquisition component 33.

Consequently, the user can ascertain the speed of the vessel merely by comparing the spacing of the range rings 61 with the length of the speed vector. Also, since the range rings 61 are used as graduations, the screen can be utilized more effectively than with a configuration in which a reference length is displayed at the bottom of the screen, for example.

A preferred embodiment of the present invention was described above, but the configuration discussed above can be modified as follows.

Figure 3B:
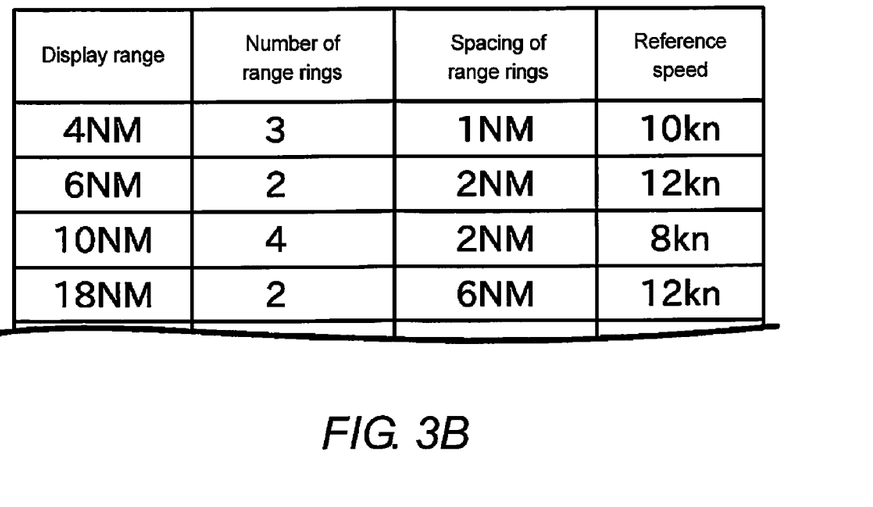

In the above embodiment, an example was given in which the reference speed was constant, but the reference speed can be variable by the user at an arbitrary timing (such as during initial setting or during use of the device). Also, as shown in FIG. 3B, the reference speed can be settable for each display range or for each number of range rings 61. Consequently, since the spacing is narrower when there are more range rings 61, for example, the configuration can be such that if the reference speed is reduced, there will be little change in the length of the speed vector.

In the above embodiment, the present invention was applied to the length of the speed vector (line segment) of the AIS symbol 63 and the TT symbol 64, but the present invention can also be applied to other symbols.

In the above embodiment, the components constituting the radar indicator 12 (movable body display device) were disposed in a single housing, but one or more of them (such as the memory component 37) can instead be disposed at a position that is physically separated.

The present invention is not limited to a marine radar device, and can be a radar device that is installed in a lighthouse or the like and is used to monitor the position and so forth of movable bodies. In addition to radar devices, the present invention can also be applied to devices that display movable bodies and range rings (such as scanning sonar). The present invention can also be applied to an information display device that is connected to a radar sensor, a fish school finder, or another such sensor and is capable of displaying various kinds of information.

The movable body in which the movable body display device of the present invention is installed is not limited to a watercraft, and can instead be an aircraft, an automobile, or the like.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A movable body display device comprising:
an acquisition component configured to acquire position and speed of a movable body;
a memory configured to store a plurality of display ranges, a number of range rings for each display range, and a reference speed corresponding to a spacing between the range rings;
an input interface configured to receive input designating one of the display ranges;
a length adjuster configured to evaluate the speed of the movable body and information pertaining to the spacing of the range rings on a screen to determine a speed vector corresponding to the speed of the movable body acquired by the acquisition component, such that a ratio of a length of the speed vector and the spacing between the range rings is maintained constant when at least one of the following occurs while continuing to represent the reference speed that remains constant:
the number of the range rings changes; and
the spacing between range rings changes in response to additional input to the input interface designating another one of the display ranges and
a display controller configured to display the movable body on the screen according to the position acquired by the acquisition component, and configured to display adjacent to the movable body the speed vector for which heading and length have been set based on the length of the speed vector determined by the length adjuster and the speed acquired by the acquisition component.

2. The movable body display device according to claim 1, wherein
the input interface is further configured to receive designation of the number of range rings displayed on the screen at a current display range, and
the length adjuster is configured to adjust the length of the speed vector indicating the reference speed based on the number of range rings, and the display controller is configured to display the speed vector based on the length of the adjusted speed vector when the input interface has received the designation of the number of range rings.

3. The movable body display device according to claim 2, wherein
the reference speed is configured to be displayed on the screen.

4. The movable body display device according to claim 1, wherein
the reference speed is configured to be displayed on the screen.

5. The movable body display device according to claim 4, wherein
the display controller has a position display mode for displaying the position of the movable body after a reference time period, in addition to a speed display mode for displaying the speed vector of the movable body, and
a position where the reference speed is displayed in the speed display mode is the same as a position where the reference time period is displayed in the position display mode.

6. The movable body display device according to claim 1, wherein
the memory is configured to store a different reference speed for each display range or for each number of range rings.

7. The movable body display device according to claim 1, wherein
the movable body includes a watercraft, and
the acquisition component is configured to acquire position and speed of other vessels based on at least one of an echo signal detected by a radar device and a signal used by a shipborne automatic identification system.

8. A movable body display method comprising:
acquiring position and speed of a movable body;
storing a plurality of display ranges, a number of range rings for each display range, and a reference speed corresponding to a spacing between the range rings;
receiving input designating one of the display ranges;
evaluating, by a processor, the speed of the movable body and information pertaining to the spacing of range rings on a screen to determine a speed vector corresponding to the speed of the movable body acquired by the acquiring, such that a ratio of a length of the speed vector and the spacing between the range rings is maintained constant when at least one of the following occurs while continuing to represent the reference speed that remains constant:
the number of the range rings changes; and
the spacing between range rings changes in response to the receiving operation receiving additional input designating another one of the display ranges
displaying the movable body on the screen according to the position acquired during the acquiring, and displaying adjacent to the movable body a speed vector for which heading and length have been set based on the length of the speed vector determined during the evaluating and the speed acquired during the acquiring.

9. The movable body display device according to claim 3, wherein
the display controller has a position display mode for displaying the position of the movable body after a reference time period, in addition to a speed display mode for displaying the speed vector of the movable body, and
a position where the reference speed is displayed in the speed display mode is the same as a position where the reference time period is displayed in the position display mode.

* * * * *